United States Patent Office 3,485,839
Patented Dec. 23, 1969

3,485,839
PROCESS FOR THE PREPARATION OF FLUORO-AROMATIC HETEROCYCLIC COMPOUNDS
George Fuller, Avonmouth, England, assignor to Imperial Smelting Corporation (N.S.C.) Limited, London, England, a British company
No Drawing. Filed Mar. 4, 1965, Ser. No. 437,316
Claims priority, application Great Britain, Mar. 10, 1964, 10,149/64
Int. Cl. C07d 51/36, 31/26; A61k 27/00
U.S. Cl. 260—251
5 Claims

ABSTRACT OF THE DISCLOSURE

A method of preparing pentafluoropyridine or tetrafluoropyrimidine involving heating pentachloropyridine or tetrachloropyrimidine respectively at about 350–600° C. with dry alkali metal fluoride for between about 1 minute and 24 hours.

---

This invention relates to the preparation of aromatic heterocyclic compounds containing fluorine atoms attached to carbon atoms in the nucleus and in particular to the preparation of nitrogen-containing heterocyclic compounds containing fluorine, for example, pentafluoropyridine, tetrafluoropyrimidine.

Few highly fluorinated aromatic heterocyclic compounds are known at present. Further progress in this field has been hampered by the lack of practicable methods of preparing these compounds. Thus, pentafluoropyridine has been prepared in very low overall yield (less than 1%) from pyridine by electrolytic fluorination to give undecafluoropiperidine which was converted into pentafluoropyridine by defluorination over iron at 560° C. (J. Burdon, D. J. Gilman, C. R. Patrick, M. Stacey and J. C. Tatlow, Nature, 1960, 186, 231).

Tetrafluoropyrimidine has been prepared recently by H. Schroeder, E. Kober, H. Ulrich, R. Ratz, M. Agahigian and C. Grundmon (see J. Org. Chem., 1962, 27, 2580) using the following route.

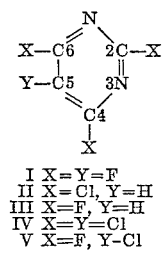

I X=Y=F
II X=Cl, Y=H
III X=F, Y=H
IV X=Y=Cl
V X=F, Y-Cl

Repeated treatment of 2,4,6-trichloropyrimidine (II) with silver monofluoride under reflux gave 2,4,6-trifluoropyrimidine (III), and fluorination of the trifluoropyrimidine (III) with silver difluoride in perfluorotributylamine gave tetrafluoropyrimidine (I). This indirect method of preparing tetrafluoropyrimidine (I) was used because the direct fluorination of tetrachloropyrimidine (IV) with silver monofluoride gave only the partly fluorinated 5-chloro-2,4,6-trifluoropyrimidine (V) which was resistant to further fluorination by silver monofluoride at 290° C. for 24 hours in an autoclave. When silver difluoride was used in an attempt to replace the remaining chlorine atom in the 5-chloro-compound (V) much decomposition took place and none of the desired tetrafluoropyrimidine (I) was obtained.

In view of this reported lack of reactivity towards fluorination of the chlorine atom in 5-chloro-2,4,6-trifluoropyrimidine (V), it was very surprising to find that tetrachloropyrimidine (IV) reacted with dried alkali metal fluoride, such as potassium fluoride or sodium fluoride to give the completely fluorinated tetrafluoropyrimidine (I). The reaction can be carried out under autogeneous pressure at 350° C.–600° C. for between one and twenty-four hours. The product is conveniently isolated from the inorganic salts by distillation under reduced pressure. The process of the present invention therefor provides a simple and direct one-stage route to perfluoro- heterocyclics such as tetrafluoropyrimidine and pentafluoropyridine. The use of alkali metal fluoride, for instance, potassium fluoride, in place of expensive silver salts is an added advantage.

The invention consists in a method for the preparation of a nitrogen-containing heterocyclic aromatic compound having fluorine atoms attached to the carbon atoms of the aromatic ring in which the corresponding nitrogen-containing heterocyclic aromatic compound with chlorine atoms attached to the carbon atoms of the aromatic ring is heated at 350° C. to 600° C. with dry alkali metal fluoride for between 1 minute and 24 hours.

Preferably, heating is carried out under autogenous pressure, and potassium fluoride or sodium fluoride is used.

Conveniently the process may be operated at atmospheric pressure or at sub-atmospheric pressure, and the vapour of the chlorine-containing starting material, optionally diluted with an inert gas such as nitrogen, may be passed over a bed of heated alkali-metal fluoride.

The method is preferably applied to pentachloropyridine or tetrachloropyrimidine to give pentafluoropyridine or tetrafluoropyrimidine respectively.

In a preferred aspect, therefore, the invention consists in a method for the preparation of pentafluoropyridine (or chlorofluoropyridines) in which pentachloropyridine is heated at 400° C.–600° C. with dry alkali metal fluoride.

EXAMPLE 1

25 g. of dry powdered potassium fluoride was heated with 5.0 g. of pentachloropyridine (99% pure) in a 60 cc. Nimonic (80% nickel/20% chromium alloy) autoclave at 500° C. during 18 hours. An autogenous pressure of 490 p.s.i. developed. After cooling, the volatile product was pumped into cooled receivers and weighed. Analysis by gas/liquid chromatography and infra-red spectroscopy gave the following results:

Pentafluoropyridine.—2.04 g. (61.2 mole percent yield)
Chlorotetrafluoropyridine.—0.29 g. (7.8 mole percent yield)
Dichlorotrifluoropyridine.—0.17 g. (4.2 mole percent yield)

EXAMPLE 2

23 g. of dry powder potassium fluoride were reacted with 5.0 g. $C_5Cl_5N$ in the apparatus described in Example 1. The temperature was 560° C. and the time of reaction was 30 minutes. The pressure developed was 490 p.s.i. The analysis of the products was as follows:

$C_5F_5N$: 1.92 g. (57.1 mole percent yield)
$C_5ClF_4N$: 0.58 g. (15.7 mole percent yield)
$C_5Cl_2F_3N$: 0.39 g. (9.7 mole percent yield)

The major component from the combined products of Examples 1 and 2 was separated by distillation (boiling range 82°–83° C.). This was 99% pure, by gas chromatography. The infra-red spectrum was identical with that reported for pentafluoropyridine by D. A. Long and R. T. Baily (Trans. Far. Soc., vol. 59, p. 599). The refractive index, $N_D^{23}$ was 1.3850.

EXAMPLE 3

17 g. of dry, powder sodium fluoride was reacted with 5.0 g. of pentachloropyridine in the apparatus described in Example 1. The reaction temperature was 560° C.

and the time of reaction was 5 hours. The product contained:

$C_5F_5N$: 0.04 g. (1.2 mole percent yield)
$C_5F_4ClN$: 0.42 g. (11.4 mole percent yield)
$C_5F_3Cl_2N$: 1.16 g. (28.9 mole percent yield)
$C_5F_2Cl_3N$: 0.84 g. (19.3 mole percent yield)

The most probable isomers are as follows (theoretical grounds):

$C_5ClF_4N$ = 3-chloro 2,4,5,6-tetrafluoropyridine
$C_5Cl_2F_3N$ = 3,5-dichloro 2,4,6-trifluoropyridine
$C_5Cl_3F_2N$ = 3,4,5-trichloro 2,6-difluoropyridine.

EXAMPLE 4

A mixture of tetrachloropyrimidine (10.9 g., 0.05 moles) and dried potassium fluoride (22.0 g., 0.38 moles) was pressurised to 50 p.s.i. with nitrogen in a nickel-chromium steel autoclave of about 50 cc. capacity and kept at 500° C. for 4 hours (final pressure 550 p.s.i.). After the autoclave had cooled to room temperature the pressure inside was 100 p.s.i. The autoclave was slowly vented to release the excess of pressure.

The autoclave was then again heated to 250° C. and the products were distilled out at 0.1 mm. pressure into two traps, in series, cooled in liquid oxygen. A colourless lachrymatory liquid (3.8 g.) was collected and by gas chromatographic analysis was found to have the following composition:

| | Percent |
|---|---|
| Tetrafluoropyrimidine | 71 |
| Chlorotrifluoropyrimidine | 25 |

The tetrafluoropyrimidine was thus obtained in 35% yield. After purification by gas chromatography, infra-red spectral analysis of the tetrafluoropyrimidine showed strong absorption bands at 1626, 1584, 1496, and 1434 cm$^{-1}$, consistent with the structure of an aromatic heterocyclic compound (Found: $n_D^{22}$ 1.3875; C, 31.4%; F, 49.4%. Calculated for $C_4F_4N_2$: C, 31.6%; F, 50.0%) Schroeder et al. cited $n_D^{25}$ 1.3875.

The present invention provides a convenient route to pentafluoropyridine and tetrafluoropyrimidine. Pentafluoropyridine has good stability to heat and to high-energy radiation and is therefore useful as a specialised heat-exchange fluid, e.g. for use in electrical transformers or in nuclear reactors.

Moreover, pyridine compounds are a well-known class of pharmaceuticals (see, for instance Thorpe, Dictionary of Applied Chemistry, 4th edition, vol. X, pp. 312–313), and the pentafluoropyridine accordingly finds application in the field of chemotherapy.

Fluorinated pyrimidine derivatives as disclosed in Nature, Mar. 30, 1957, pp. 663 to 666 have an anti-tumour activity.

I claim:

1. A method for preparing a compound selected from pentafluoropyridine and tetrafluoropyrimidine comprising heating a compound selected from pentachloropyridine and tetrachloropyrimidine respectively at from about 350° C. to 600° C. with dry alkali metal fluoride for between about 1 minute and 24 hours.

2. A method for the prepartion of pentafluoropyridine (or chlorofluoropyridines) in which pentachloropyridine is heated at 400° C.–600° C. with dry alkali metal fluoride.

3. A method as in claim 1 in which heating is carried out under autogenous pressure.

4. A method as claimed in claim 1 in which the alkali metal fluoride is potassium fluoride.

5. A method as claimed in claim 1 in which the alkali metal fluoride is sodium fluoride.

References Cited

UNITED STATES PATENTS 3,280,124 10/1966 Baudakian et al. _____ 260—251
3,314,955 4/1967 Baudakian et al. _____ 260—251

NICHOLAS S. RIZZO, Primary Examiner

R. V. RUSH, Assistant Examiner

U.S. Cl. X.R.

252—67; 260—290, 999